April 22, 1969   J. A. D. P. LHERAULT ET AL   3,439,996
TILE ASSEMBLY FOR RADIANT GAS BURNERS
Filed June 9, 1965
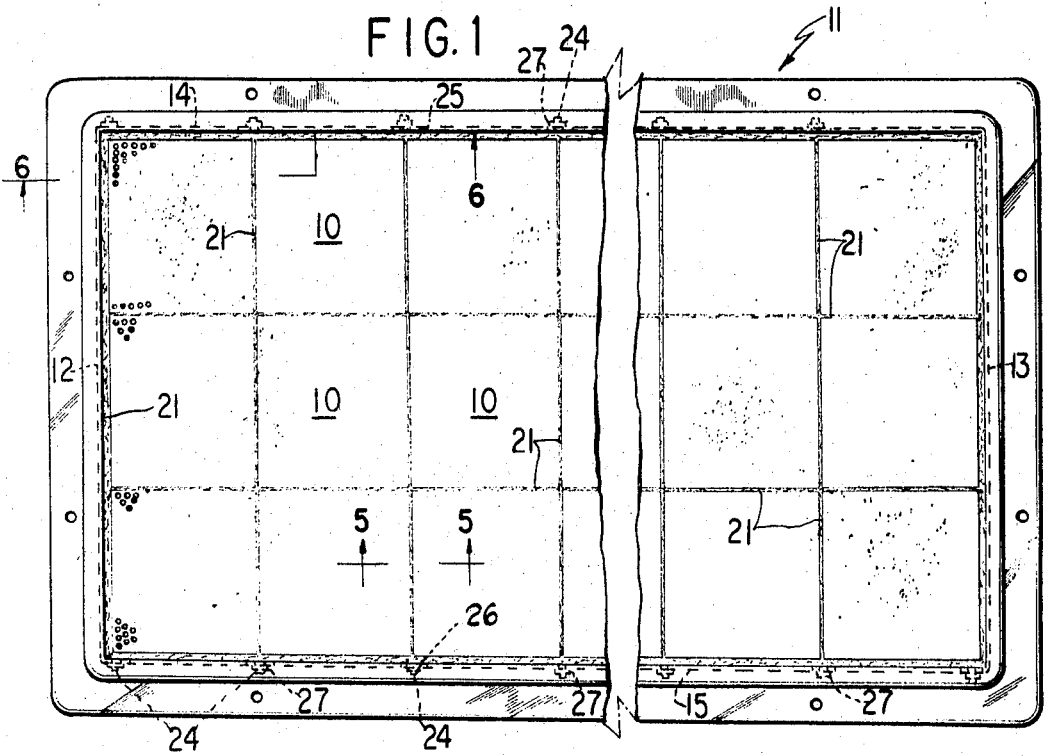
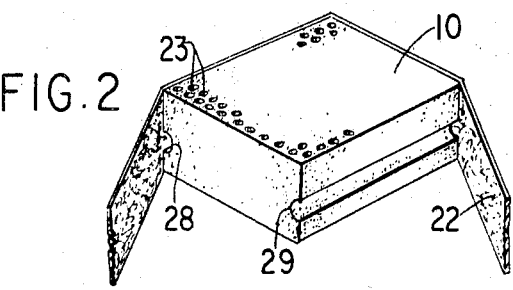
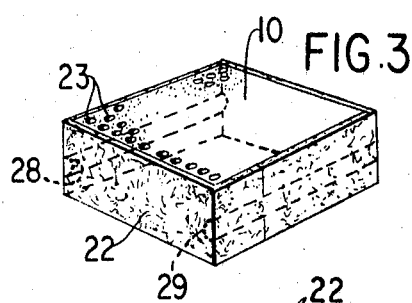
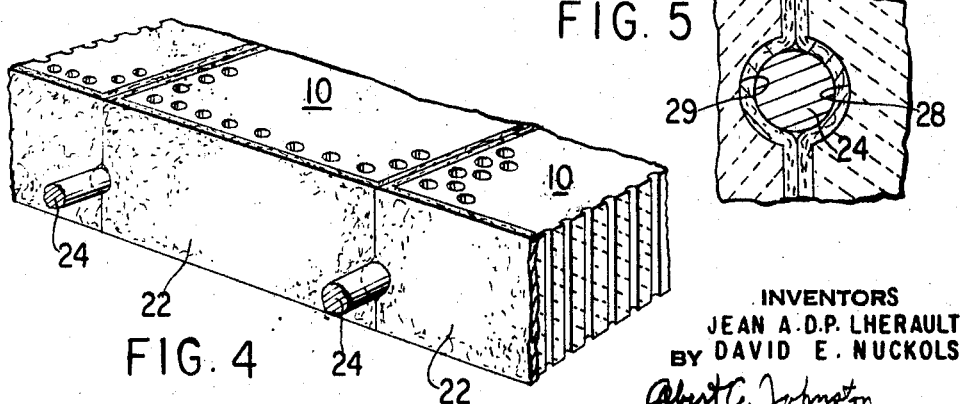
INVENTORS
JEAN A. D. P. LHERAULT
DAVID E. NUCKOLS
BY
ATTORNEY

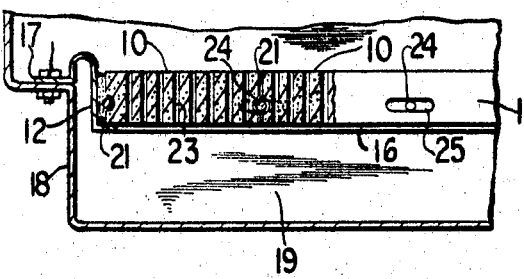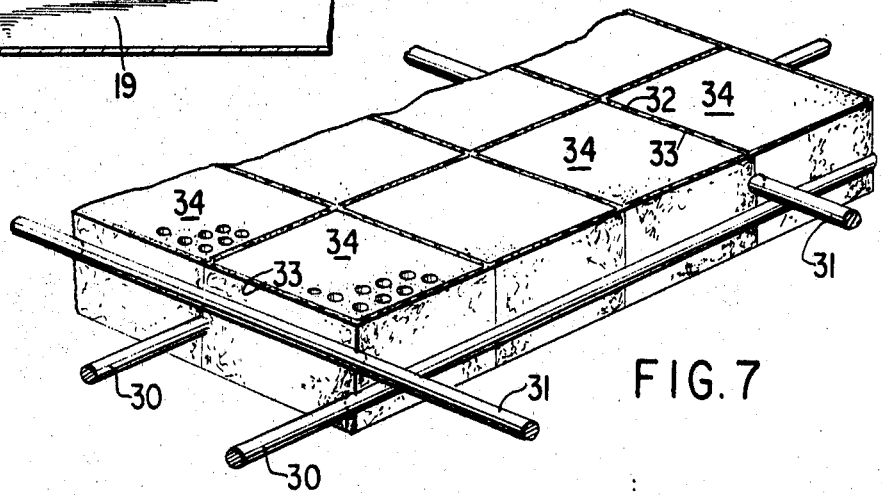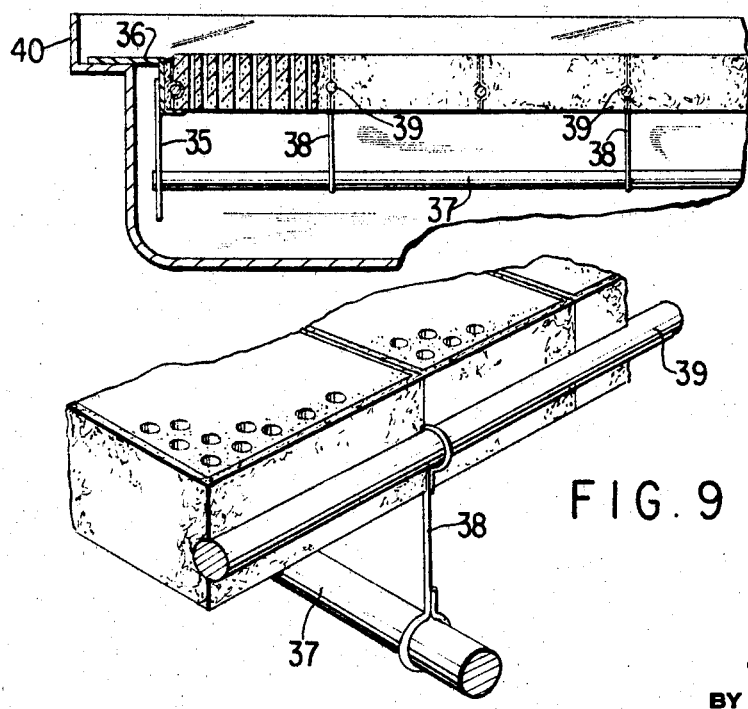

Patented Apr. 22, 1969

3,439,996
TILE ASSEMBLY FOR RADIANT GAS BURNERS
Jean A. D. P. Lherault, Paris, France, and David E. Nuckols, Richmond, Va., assignors to Solaronics, Inc., Richmond, Va., a corporation of Virginia
Filed June 9, 1965, Ser. No. 462,497
Int. Cl. F23d *13/12*
U.S. Cl. 431—328                                        10 Claims This invention relates to radiant gas burners, or gas-fired radiant heaters, and more particularly to burner plates for such apparatus which are constituted of assembled heat-insulating foraminous refractory tiles or blocks.

A burner plate of this nature is used at the open side of a plenum chamber into which a combustible mixture of fuel gas and air is supplied for delivery to the outer face of the plate through myraids of minute passages formed in the tiles. The heat of combustion of the gas mixture outside the plate accumulates to a high intensity at the face of the plate so as to be dissipated largely by radiation.

It has been common practice to join together a large number of perforated ceramic tiles arranged in rows to provide a unitary burner plate. The tiles are joined side by side with a refractory jointing compound or tile cement which, upon hardening, bonds the tiles together and holds them in assembled relationship much as bricks are bonded together by mortar.

Even though the dimensions of the tiles are substantially uniform, the thicknesses of the various joints may vary and result in a plate that is oversized or undersized in respect to a frame at the open side of a plenum chamber in which the plate is to be mounted. Should the cement not be evenly applied at all of the joints, some of the joints may be so much weaker than others that failures will occur in the structure before it has given the expected service life.

However carefully the plate may be manufactured, a plate constituted of cemented ceramic tiles is a relatively rigid yet relatively fragile structure. Owing to its rigidity and the fragility of the tiles and of the jointing cement, it is susceptible of being damaged in transport and in handling. The dropping or unintentional twisting of a plate can result in the cracking of the cement. Cracking of the cement from any cause may cause fragments of the cement or of the tiles to be released during use. Passages formed upon the release of loosened material cannot be tolerated because of the danger that a flame may flash back through them to ignite the gas mixture in the plenum chamber.

Failures of burner plates of the kind mentioned often arise not only from physical stresses but also from differential strains which occur in the structure when the plates are in use. The ceramic tiles and the refractory cement have different coefficients of thermal expansion. Differential strains occur at the combustion surface because of temperature gradients commonly existing over its area, and they also develop from the greatly different temperature levels existing at the opposite faces of a plate when it is in use. After many cycles of ignition and extinction of the burner, cracks are likely to appear in the tiles and in the cement. Also, varying degrees of pressure exerted by one tile on another tend to cause relative movement between adjacent tiles and breakage of the bond and seal between them, with fragmentation of cement, and chipping or spalling of material from the surfaces of adjacent tiles.

It is among the objects of the present invention to provide a novel burner plate assembled from a plurality of ceramic tiles and to alleviate deficiences incident to burner plate structures constituted of tiles which are joined by cement.

Another object is to provide an exceptionally durable and long-lived burner plate structure comprising an assembly of refractory tiles.

According to the present invention, a radiant gas burner plate is constituted by a multiplicity of heat-insulating refractory tiles which are resiliently held in side by side and mutually sealed relation by tie wires which extend under tension through the plate in paths intermediate the outer and inner faces of the plate, with each wire bearing laterally against a plurality of the tiles. The tie wires can be made of any suitably strong and heat resistant material, such as steel or any of various alloys; for example, they may resemble bicycle spokes. For convenience of assembly of a plate making use of them, the tie wires can be disposed between and along adjacent rows of the tiles which form the body of the plate, so that each wire will bear laterally against confronting sides of the tiles of two of the rows.

By virtue of this manner of construction, the plate is enabled to withstand torsional stress and to flex upon being subjected to forces directed against either of its faces, without causing the opening of seams between the tiles.

According to another feature of the invention, adjacent tiles of the assembly are separated from one another by a layer or layers of a compressible heat-resistant cushioning fabric which contribute to the resilience and durability of the plate and also to the sealing of the joints between the tiles. The cushioning material provides a protective cushion for the tiles bearing laterally against it, which absorb forces that otherwise would tend to fracture the tiles and makes the plate structure highly resistant to physical shocks, temperature stresses, and the like.

A further feature of the invention concerns the formation of the tiles themselves to facilitate the positioning and holding of them in desired locations by the tie wires. To this end, the side walls of the tiles which are to be aligned at the sides of rows thereof engaged by the tie wires are formed with grooves extending parallel to their respective faces. The grooves are made so that they may be aligned when the tiles are arranged in rows and may then be occupied by a lateral portion of a supporting tie wire bearing against the tiles of a row. The desired secure holding of the tiles in place, with their respective outer faces in even alignment, is thus assured. Moreover, the grooves are preferably made so that portions of a layer or layers of the cushioning fabric may be pressed into them by a supporting tie wire, in order to cushion the bearing of the wire against the tiles and enhance the seal formed between and along rows of the tiles.

For a large burner plate which is much longer in one direction than in the transverse direction, a set of parallel tie wires may be disposed between rows of tiles extending in the shorter direction of the plate and additional tie wires may be employed in the longer direction to restrict deflection or bulging of the plate which otherwise might occur owing to the long span of the tile assembly. The tiles to be used in such a structure may be formed with aligned passages or grooves to receive tie wires extending in the longitudinal direction of the plate, as well as with passages to receive wires extending transversely of the plate. The number of tie wires to be used will be selected according to the size of the plate and the number of tiles required to form it.

In some cases, as when a single burner plate is to provide a very large radiation surface of several feet in extent, there may be a tendency for the plate to bulge out of its normal plane under the high temperature conditions of its use. This can be avoided by the provision of suitable stays connecting tie wires in the plate with supports fixed in the plenum chamber inwardly of the plate.

Other objects, features and advantages of the invention and preferred ways of practicing it will be evident from the accompanying drawings and the following detailed description of illustrative embodiments of the invention.

In the drawings:

FIG. 1 is a plan view of a burner plate incorporating the principle of the invention;

FIG. 2 illustrates a manner of applying a strip of cushioning fabric to a tile to be assembled in the plate;

FIG. 3 illustrates a tile obtained according to FIG. 2;

FIG. 4 is an enlarged fragmentary view of several adjacent tiles and supporting tie wires;

FIG. 5 is a fragmentary sectional view taken on line 5—5 of FIG. 1;

FIG. 6 is a sectional view taken on line 6—6 of FIG. 1;

FIG. 7 is illustrative of an embodiment in which crossing sets of tie wires are employed; and FIG. 8 illustrates a structure that may be used to resist bulging of a burner plate of extraordinarily large surface area.

FIG. 9 is a fragmentary view of a portion of the structure of FIG. 8.

A manner of utilizing the invention is illustrated in FIGS. 1 and 6 which show a multiplicity of perforated ceramic tiles 10 arranged in contiguous rows running crosswise and lengthwise of a rectangular frame 11 having side walls 12 and 13, joined, respectively, to opposite side walls 14 and 15 and thus providing the boundary of an opening for receiving a burner plate. The burner plate comprises rows of tiles parallel to the walls 12 and 13 and rows of tiles parallel to the walls 14 and 15. It is to be understood that the number of tiles in each row can be varied to suit the shape and area required to meet the specifications of a particular burner.

A flange, such as the lip 16, as best seen in FIG. 6, extends inwardly of the side walls of the frame sufficiently to underlie the edges of the tiles adjacent to the side walls. Each side wall extends upwardly into a loop which connects with a flange 17 adapted for attaching the frame, by means of bolts 20, to a rim of a housing 18 which forms the plenum chamber 19. A suitable frame may be made of sheet metal.

Layers of a compressible heat-resistant cushioning fabric 21 are interposed between adjacent tiles and between each of the frame walls 12, 13, 14 and 15 and the adjacent rows of tiles. The cushioning fabric may be in the form of strips of a felted fibrous material that is compressible yet resilient and fully resistant to the high and changeable temperature conditions which will be encountered in the use of the burner. For example, a fabric of ceramic or asbestos fibers may be employed. Satisfactory results have been attained with a felted fabric obtained from The Carborundum Co. under the name of "Fibrefrax."

As indicated in FIG. 2, a strip 22 of the refractory cushioning fabric can be wrapped around each tile so as to cover its sides and form a cushioned tile of the form indicated in FIG. 3. A tile enveloped in this manner can be more easily handled if the strip is tacked to the tile with a light adhesive.

Ceramic tiles used in burner plates contain a myriad of minute gas-conducting passages 23 extending between their opposite faces. The number of passages is limited by the character of the refractory material of which a tile is made.

The tiles are supported and retained in the frame 11 by a plurality of tie wires 24 extending in spaced parallel relation through the burner plate and through holes 25, 26, in the opposite frame walls 14, 15. The holes are elongated lengthwise of the frame so as to permit adjustment of the wires and rows of tiles before nuts 27 screwed on the ends of the wires are tightened to hold the wires and tiles in their ultimate positions.

As shown in FIGS. 2 and 5, each tile has a groove 28 in a side surface and a groove 29 in the side surface opposite thereto. The grooves are equi-spaced from and parallel to the outer face of the tile. When a row of tiles having their grooves 29 aligned is placed next to a row of tiles having their grooves 28 aligned, the two adjacent strings of grooves provide a continuous tubular passage along and between the two rows of tiles. The confronting grooves form a passage of sufficient size to receive opposite lateral portions of a tie wire and portions of layers of the cushioning fabric which are disposed at either side of the wire between it and the adjacent tile, as indicated in FIG. 5.

The burner plate shown in FIG. 1 may be assembled with cushioned tiles such as the tile of FIG. 3 by first placing a row of the tiles with their respective grooved sides aligned against a tie wire 24 adjacent the end wall 12 of the frame. A half-round bead raised from the frame wall may be used instead of the first tie wire. Similar tie wires 24 are strung across the frame with their threaded ends extending through the slots 25, 26 in the frame walls, and additional rows of the tiles are inserted row by row so that there will be a tie wire extending between and along the confronting faces of the tiles of each two adjacent rows in the shorter or transverse direction of the frame. As the rows of tiles and the tie wires are mounted in place, they are pressed one against another and towards an end wall of the frame, until the open area of the frame is completely occupied by the tiles.

It is convenient to make up a burner plate by assembling rows of the tiles step by step from oposite ends of a frame. For a plate containing, say, fifteen rows of four tiles each, seven rows can be assembled from each end of the frame. The two groups of twenty-eight tiles each may then be pressed toward their respective ends of the frame, as by the use of suitable clamps, so as to compress the layers of cushioning fabric between the tile rows already in place and form a space between the two groups of tiles and tie wires, which is wide enough to receive the fifteenth or final row of the tiles.

The final row is then placed between the tie wires extending along the exposed sides of the innermost rows of the two groups, whereupon the clamps are removed. Upon being relieved of clamping pressure, the cushioning fabric compressed between the rows of tiles springs back and brings all the rows of tiles into a closed plate assembly. Thereupon the nuts 27 on the ends of the tie wires are tightened to fix the wires securely in place and hold them taut so that they in turn will securely hold the tiles in place.

The cushioning fabric acts as a buffer and closes spaces between the tiles. It is evident that this effect can be achieved with a single ply of cushioning material. This can be accomplished, for example, by placing a single strip of the fabric between adjacent rows of tiles, or by placing unwrapped tiles alternately with wrapped tiles in crossing rows of tiles so that the sides of each unwrapped tile are covered by portions of the strips of cushioning material around four adjacent wrapped tiles.

When the tiles are manufactured to very precise dimensions, the use of cushioning material between them may be entirely dispensed with and only the tie wires used to hold the tiles in mutually sealed relation. Such an assembly is of advantage particularly for burner plates of small sizes.

Another manner of employing the invention is to provide a second set of parallel tie wires extending transverse to a primary set of parallel tie wires. In an arrangement such as is illustrated in FIG. 7, the tie wires 30 are of a set of wires extending parallel to the shorter sides of a frame and the tie wires 31 are of a second set of wires extending parallel to the longer sides of the frame. Grooves for the wires 31 are formed in the sides 32, 33 of the tiles 34 which are at right angles to the grooves for the wires 30.

A support may be used to limit deflection or bulging of a large burner plate. Referring to FIG. 8, a bracket 35 which is fixed to one side of a burner plate frame 36 supports a rod 37 which is supported at its other end by a similar bracket fixed to the opposite side of the frame. Suitable stays such as wires 38 are individually connected to tie wires 39 in the plate end to the rod 37. One or more wires 38 may be used with a single rod, and one or more rods or other mountings for stays such as the wires 38 may be employed, depending upon the length and width of a particular burner plate. The burner plate frame 36 is mounted in the plenum chamber housing 40.

It will be evident that new features of the present invention may be embodied in various forms of apparatus other than those particularly described hereinabove and that the invention is not restricted to these illustrative embodiments except as may be required by a fair construction of the appended claims.

What is claimed is:

1. In a radiant gas burner comprising a multiplicity of heat-insulating refractory tiles assembled side by side in side by side rows thereof constituting a burner plate, each of said tiles having a myriad of minute passages extending therethrough for conducting a combustible gas mixture to the outer face of said plate, means resiliently holding said tiles in assembled and mutually sealed relation including tie wires extending under tension through said plate between and along adjacent rows of said tiles and compressible heat resistant cushioning means between said tie wires and the respective tiles adjacent thereto, each of said tie wires bearing laterally through such cushioning means against confronting sides of the tiles of two of said rows.

2. In a radiant gas burner comprising a multiplicity of heat-insulating refractory tiles assembled side by side in side by side rows constituting a burner plate, each of said tiles having a myriad of minute passages extending therethrough for conducting a combustible gas mixture to the outer face of said plate, means resiliently holding said tiles in assembled and mutually sealed relation including layers of a compressible heat-resistant cushioning fabric disposed between and along adjacent rows of said tiles and tie wires extending under tension through said plate between and along such rows, each of said tie wires bearing laterally through adjacent layers of said cushioning fabric against confronting sides of the tiles of two of said rows.

3. A burner as defined in claim 2, said cushioning fabric being composed of felted refractory mineral fibers.

4. In a radiant gas burner comprising a multiplicity of heat-insulating refractory tiles assembled side by side in side by side rows thereof constituting a burner plate, each of said tiles having a myriad of minute passages extending therethrough for conducting a combustible gas mixture to the outer face of said plate, means resiliently holding said tiles in assembled and mutually sealed relation including tie wires extending under tension through said plate between and along adjacent rows of said tiles and compressible heat resistant cushioning means between said tie wires and the respective tiles adjacent thereto, each of said tie wires bearing laterally through such cushioning means against respective confronting sides of the tiles of two of said rows, said sides having aligned grooves formed therein substantially parallel to the faces of the respective tiles, the tie wire that bears against said sides being seated in and holding such cushioning means pressed into said grooves and holding said faces in alignment.

5. In a radiant gas burner comprising a multiplicity of heat-insulating refractory tiles assembled side by side in side by side rows constituting a burner plate, each of said tiles having a myriad of minute passages extending therethrough for conducting a combustible gas mixture to the outer face of said plate, means resiliently holding said tiles in assembled and mutually sealed relation including layers of a compressible heat-resistant cushioning fabric disposed between and along adjacent rows of said tiles and tie wires extending under tension through said plate between and along such rows, each of said tie wires bearing laterally through adjacent layers of said cushioning fabric against the respective confronting sides of the tiles of two of said rows, said sides having aligned grooves formed therein substantially parallel to the faces of the respective tiles, the tie wire that bears against said sides being seated in said grooves and holding said cushioning fabric pressed thereinto, thereby holding said faces in alignment and forming a seal of compressed fabric along said sides.

6. In a radiant gas burner comprising a plenum chamber to receive a combustible gas mitxure, a frame bordering one side of said chamber and a foraminous refractory burner plate mounted in said frame, said plate being constituted by a multiplicity of heat-insulating refractory tiles assembled side by side in side by side rows thereof, each of said tiles having a myriad of passages extending therethrough for conducting said mixture to the outer face of said plate, means resiliently holding said tiles in assembled and mutually sealed relation including layers of a compressible heat-resistant cushioning fabric disposed between the adjacent sides of said tiles and tie wires extending through said plate under tension between opposite sides of said frame, said tie wires bearing laterally against respective rows of said tiles through contiguous layers of said cushioning fabric and holding said rows pressed laterally one toward another.

7. A burner as defined in claim 6, the sides of said tiles which form confronting sides of adjacent rows thereof being formed with aligned grooves therein extending substantially parallel to the faces of said tiles, said tie wires having opposite side portions thereof seated in and holding contiguous layers of said cushioning fabric pressed into said grooves.

8. A burner as defined in claim 6, each of said tiles having a strip of said cushioning fabric wrapped about it upon all its sides.

9. In a radiant gas burner comprising a plenum chamber to receive a combustible gas mixture, a frame bordering one side of said chamber and a foraminous refractory burner plate mounted in said frame, said plate being constituted by a multiplicity of heat-insulating refractory tiles assembled side by side in side by side rows thereof, each of said tiles having a myriad of passages extending therethrough for conducting said mixture to the outer face of said plate, means resiliently holding said tiles in assembled and mutually sealed relation including layers of a compressible heat-resistant cushioning fabric disposed between the adjacent sides of said tiles and tie wires extending through said plate under tension between opposite sides of said frame, said tie wires bearing laterally against respective rows of said tiles and holding the same pressed laterally one toward another and against layers of said cushioning fabric, said tie wires having end portions thereof extending through openings in said opposite sides of said frame and provided with means outside said frame for tensioning and anchoring said wires, at least some of said openings being elongated in the direction along said frame whereby each of said wires may be positioned to bear laterally against a row of said tiles before the wire is tensioned and anchored relative to said frame.

10. In a radiant gas burner comprising a plenum chamber to receive a combustible gas mixture, a frame bordering one side of said chamber and a foraminous refractory burner plate mounted in said frame, said plate being constituted by a multiplicity of heat-insulating refractory tiles assembled side by side in side by side rows thereof, each of said tiles having a myriad of passages extending therethrough for conducting said mixture to the outer face of said plate, means resiliently holding said tiles in assembled and mutually sealed relation including layers of a compressible heat-resistant cushioning fabric disposed between the adjacent sides of said tiles and tie wires extending through said plate under tension between opposite sides of said frame, said tie wires bearing laterally against respective rows of said tiles and holding the same pressed laterally one toward another and against layers of said cushioning fabric, said burner further including supports fixed in said plenum chamber inwardly of said plate and stay means connecting said tie wires with said supports to prevent bulging of said plate.

References Cited

UNITED STATES PATENTS

| 1,541,016 | 6/1925 | Wertheim et al. | 110—173 |
| 3,008,513 | 11/1961 | Holden | 158—99 X |

FOREIGN PATENTS

| 538,771 | 1/1956 | Italy. |
| 793,343 | 4/1958 | Great Britain. |

FREDERICK L. MATTESON, Jr., *Primary Examiner.*